US012601928B2

(12) United States Patent
Arkin et al.

(10) Patent No.: US 12,601,928 B2
(45) Date of Patent: Apr. 14, 2026

(54) DETERMINING A PROGRESSIVE LENS OPTICAL DESIGN

(71) Applicant: ADDON OPTICAL LTD., Netanya (IL)

(72) Inventors: Jed Arkin, Savyon (IL); Haim Engler, Maale Adumim (IL)

(73) Assignee: ADDON OPTICS LTD., Netanya (IL)

( * ) Notice: Subject to any disclaimer, the term of this patent is extended or adjusted under 35 U.S.C. 154(b) by 773 days.

(21) Appl. No.: 17/904,036

(22) PCT Filed: Jan. 31, 2021

(86) PCT No.: PCT/IB2021/050759

§ 371 (c)(1),
(2) Date: Aug. 11, 2022

(87) PCT Pub. No.: WO2021/161125

PCT Pub. Date: Aug. 19, 2021

(65) Prior Publication Data

US 2023/0127754 A1     Apr. 27, 2023

Related U.S. Application Data

(60) Provisional application No. 62/977,313, filed on Feb. 16, 2020.

(51) Int. Cl.
G02C 7/02 (2006.01)
G02C 7/06 (2006.01)

(52) U.S. Cl.
CPC ............. G02C 7/027 (2013.01); G02C 7/061 (2013.01)

(58) Field of Classification Search
CPC ........ G02C 7/027; G02C 7/061; G02C 7/028; G02C 7/086
See application file for complete search history.

(56) References Cited

U.S. PATENT DOCUMENTS

| | | | |
|---|---|---|---|
| 2,511,329 A | 6/1950 | Edward | |
| 2,759,394 A | 8/1956 | Evans | |

(Continued)

FOREIGN PATENT DOCUMENTS

| | | | |
|---|---|---|---|
| CA | 2360230 A1 | 7/2000 | |
| CN | 101467076 A | 6/2009 | |

(Continued)

OTHER PUBLICATIONS

Corrected Notice of Allowance for U.S. Appl. No. 16/898,954 mailed Mar. 31, 2023.

(Continued)

*Primary Examiner* — Matthew Y Lee
(74) *Attorney, Agent, or Firm* — Ballard Spahr LLP

(57) ABSTRACT

Apparatus and methods are described, including providing a temporary progressive lens (20) that is configured for a subject's temporary use, based upon an initial progressive-lens optical design. The lens is composed of a base lens (22) and an attached additional and removable progressive lens part (24) for test purposes. Data that are indicative of suitability of the optical design for activities that are performed by the subject are received, the data being generated during use of the temporary progressive lens by the subject. Based upon the received data, the optical design for a progressive lens for the subject is optimised, and the optimised optical design in output.

19 Claims, 2 Drawing Sheets

(56) References Cited

U.S. PATENT DOCUMENTS

| | | | |
|---|---|---|---|
| 3,628,854 A | 12/1971 | Jampolsky | |
| 3,877,798 A | 4/1975 | Tolar et al. | |
| 3,904,281 A | 9/1975 | Jampolsky | |
| 4,173,606 A | 11/1979 | Kalal et al. | |
| 4,547,049 A | 10/1985 | Cotie | |
| 4,650,275 A | 3/1987 | Jones | |
| 4,781,452 A | 11/1988 | Ace | |
| 4,859,261 A | 8/1989 | Ace | |
| 4,867,553 A | 9/1989 | Frieder | |
| 4,883,548 A | 11/1989 | Onoki | |
| 4,921,626 A | 5/1990 | Rhodenbaugh | |
| 4,923,758 A | 5/1990 | Marks et al. | |
| 4,969,729 A | 11/1990 | Merle | |
| 5,420,651 A | 5/1995 | Kamppeter | |
| 5,478,824 A | 12/1995 | Burns et al. | |
| 5,617,153 A | 4/1997 | Allen et al. | |
| 5,677,751 A * | 10/1997 | Gerber | G02C 13/005 |
| | | | 351/204 |
| 5,748,279 A | 5/1998 | Glanzbergh | |
| 5,764,333 A | 6/1998 | Somsel | |
| 5,790,227 A | 8/1998 | Rorabaugh | |
| 5,926,250 A | 7/1999 | Mukaiyama et al. | |
| 6,019,470 A | 2/2000 | Mukaiyama et al. | |
| 6,027,214 A | 2/2000 | Graham | |
| 6,139,148 A | 10/2000 | Menezes | |
| 6,170,952 B1 | 1/2001 | La et al. | |
| 6,244,705 B1 | 6/2001 | Ledbetter et al. | |
| 6,258,218 B1 | 7/2001 | Burton | |
| 6,290,354 B1 | 9/2001 | Safran | |
| 6,807,824 B1 | 10/2004 | Miwa | |
| 6,881,269 B2 | 4/2005 | Matsuzawa et al. | |
| 7,036,929 B1 | 5/2006 | Harvey | |
| 7,250,197 B2 | 7/2007 | Rastogi et al. | |
| 7,934,831 B2 | 5/2011 | Spivey et al. | |
| 8,042,941 B2 | 10/2011 | Alonso et al. | |
| 8,202,392 B2 | 6/2012 | Jiang et al. | |
| 8,702,230 B2 | 4/2014 | Yi et al. | |
| 8,714,739 B2 | 5/2014 | Rouault De Coligny | |
| 9,156,213 B2 | 10/2015 | Qiu et al. | |
| 9,529,118 B2 | 12/2016 | Ryu et al. | |
| 9,733,489 B2 | 8/2017 | Paille et al. | |
| 9,915,830 B2 | 3/2018 | Curley et al. | |
| 9,995,948 B2 | 6/2018 | Arieli et al. | |
| 10,126,571 B2 | 11/2018 | Junkins | |
| 10,437,309 B2 | 10/2019 | Milford | |
| 10,712,591 B2 | 7/2020 | Arieli et al. | |
| 11,378,821 B2 | 7/2022 | Katzman et al. | |
| 11,745,476 B2 | 9/2023 | Katzman et al. | |
| 2002/0149739 A1 | 10/2002 | Perrott et al. | |
| 2003/0017340 A1 | 1/2003 | Jiang et al. | |
| 2003/0048405 A1 | 3/2003 | Rivera | |
| 2004/0055994 A1 | 3/2004 | Miwa | |
| 2004/0126587 A1 | 7/2004 | Maki et al. | |
| 2007/0121058 A1 | 5/2007 | Chuang | |
| 2009/0004478 A1 | 1/2009 | Baetzold et al. | |
| 2009/0046242 A1 | 2/2009 | Nicolson et al. | |
| 2010/0007846 A1 | 1/2010 | Fermigier et al. | |
| 2010/0007847 A1 | 1/2010 | Cano et al. | |
| 2010/0193112 A1 | 8/2010 | Bovet et al. | |
| 2010/0208197 A1 | 8/2010 | Carimalo et al. | |
| 2010/0238400 A1 | 9/2010 | Volk | |
| 2010/0239776 A1 | 9/2010 | Yajima et al. | |
| 2010/0259717 A1 | 10/2010 | Fermigier et al. | |
| 2011/0146893 A1 | 6/2011 | Marty | |
| 2011/0181828 A1 | 7/2011 | Yi et al. | |
| 2012/0013980 A1 | 1/2012 | Begon | |
| 2012/0249949 A1 | 10/2012 | Miyoshi | |
| 2012/0262666 A1 | 10/2012 | Boinard | |
| 2013/0070196 A1 | 3/2013 | Tokumaru | |
| 2013/0154906 A1 | 6/2013 | Braun et al. | |
| 2014/0151911 A1 | 6/2014 | Tokumaru | |
| 2015/0049306 A1 * | 2/2015 | Haddadi | A61B 3/0008 |
| | | | 351/246 |
| 2015/0286070 A1 * | 10/2015 | Aikawa | G02B 27/0093 |
| | | | 351/159.76 |

| | | | |
|---|---|---|---|
| 2016/0109622 A1 | 4/2016 | Yoshida | |
| 2016/0161761 A1 | 6/2016 | Quere et al. | |
| 2016/0178934 A1 | 6/2016 | Curley et al. | |
| 2016/0252747 A1 | 9/2016 | Lortscher | |
| 2016/0311184 A1 | 10/2016 | Gourraud | |
| 2017/0059885 A1 | 3/2017 | Patel | |
| 2017/0059886 A1 * | 3/2017 | Fayolle | G02C 7/028 |
| 2017/0156587 A1 * | 6/2017 | Rifai | A61B 5/11 |
| 2017/0188813 A1 * | 7/2017 | Arnold | A61B 3/103 |
| 2017/0235130 A1 | 8/2017 | Baker | |
| 2017/0269379 A1 | 9/2017 | Arieli et al. | |
| 2017/0299886 A1 | 10/2017 | Carmon et al. | |
| 2018/0077992 A1 | 3/2018 | Kataoka et al. | |
| 2018/0259794 A1 | 9/2018 | Arieli et al. | |
| 2019/0212564 A1 * | 7/2019 | Rousseau | G06F 3/013 |
| 2019/0324290 A1 * | 10/2019 | El-Hajal | G02C 7/06 |
| 2020/0285074 A1 * | 9/2020 | Zimanyi | G02B 27/0172 |
| 2020/0301171 A1 | 9/2020 | Arieli et al. | |
| 2021/0387303 A1 | 12/2021 | Katzman et al. | |
| 2022/0244542 A1 | 8/2022 | Bouchier et al. | |
| 2022/0326547 A1 | 10/2022 | Bakaraju | |
| 2023/0089288 A1 | 3/2023 | Fujinaka | |
| 2023/0127754 A1 | 4/2023 | Arkin et al. | |

FOREIGN PATENT DOCUMENTS

| | | |
|---|---|---|
| CN | 101466528 | 9/2009 |
| CN | 101743501 A | 6/2010 |
| CN | 103197436 A | 7/2013 |
| CN | 106461978 A | 2/2017 |
| CN | 206725875 U | 12/2017 |
| CN | 110515219 A | 11/2019 |
| EP | 1870738 A2 | 12/2007 |
| EP | 4159423 A1 | 4/2023 |
| EP | 3615318 B1 | 8/2023 |
| GB | 1100148 A | 1/1968 |
| JP | S4870647 A | 9/1973 |
| JP | S5336252 B1 | 10/1978 |
| JP | S62263021 | 11/1987 |
| JP | 01026818 A | 1/1989 |
| JP | S6426818 U | 2/1989 |
| JP | 04120927 U | 10/1992 |
| JP | H058534 U | 2/1993 |
| JP | H0572504 | 3/1993 |
| JP | H09154479 A | 6/1997 |
| JP | H10233430 | 9/1998 |
| JP | 2005249842 A | 9/2005 |
| JP | 2007102057 A | 4/2007 |
| JP | 2010033070 A | 2/2010 |
| JP | 2010507834 A | 3/2010 |
| JP | 2010508552 A | 3/2010 |
| JP | 2011201267 | 10/2011 |
| JP | 2012038880 | 2/2012 |
| JP | 2012128458 A | 7/2012 |
| JP | 2014200943 A | 10/2014 |
| JP | 2016539366 | 12/2016 |
| JP | 2017516161 A | 6/2017 |
| JP | 2022537025 A | 8/2022 |
| WO | 0071330 A1 | 11/2000 |
| WO | 0105578 A1 | 1/2001 |
| WO | 2003023495 A2 | 3/2003 |
| WO | 2009014086 | 1/2009 |
| WO | 2009103359 A1 | 8/2009 |
| WO | 2011074076 | 6/2011 |
| WO | 2011105055 | 9/2011 |
| WO | 2011155550 | 12/2011 |
| WO | 2013169987 A1 | 11/2013 |
| WO | 2014084339 A1 | 6/2014 |
| WO | 2014189078 | 11/2014 |
| WO | 2015124574 A1 | 8/2015 |
| WO | 2015173797 A1 | 11/2015 |
| WO | 2017042612 A1 | 3/2017 |
| WO | 2019049835 | 3/2019 |
| WO | 2019219627 A1 | 11/2019 |
| WO | 2021059128 A1 | 4/2021 |
| WO | 2021161125 A1 | 8/2021 |

(56) References Cited

FOREIGN PATENT DOCUMENTS

WO    2021198822 A1    10/2021
WO    2024100506 A1    5/2024

OTHER PUBLICATIONS

Examination Report for Indian Application No. 202247051124 mailed Feb. 27, 2023.
Examination Report for Indian Application No. 202248053824 mailed Mar. 1, 2023.
Extended European Search Report for European Application No. 22206182.2 mailed Feb. 27, 2023.
International Search Report and Written Opinion from International Application No. PCT/IB2022/057416 mailed Nov. 22, 2022.
Issue Notification for U.S. Appl. No. 16/898,954 mailed Jul. 19, 2023.
Notice of Allowance for U.S. Appl. No. 16/898,954 mailed on Mar. 20, 2023.
Non-Final Office Action for U.S. Appl. No. 16/898,954 mailed Oct. 27, 2022.
U.S. Appl. No. 17/904,269, filed Aug. 15, 2022.
U.S. Appl. No. 18/051,140, filed Oct. 31, 2022.
U.S. Appl. No. 63/002,388, filed Mar. 31, 2020.
U.S. Appl. No. 63/002,393, filed Mar. 31, 2020.
Notice of Allowance for U.S. Appl. No. 17/763,351 mailed Oct. 1, 2024.
Office Action for Canadian Application No. 3,151,806 mailed Jun. 12, 2024.
Office Action for Canadian Application No. 3,170,681 mailed Aug. 6, 2024.
Office Action for Chinese Application No. 202080067832.9 mailed Oct. 18, 2024.
Office Action for Japanese Application No. 2022-509599 mailed Sep. 11, 2024.
Decision of Rejection for Chinese Application No. 202080067832.9 mailed Dec. 27, 2023.
International Search Report and Written Opinion from International Application No. PCT/IB2023/061107 mailed Feb. 27, 2024.
Non-Final Office Action for U.S. Appl. No. 17/763,351 mailed May 20, 2024.
Office Action for Japanese Application No. 2022-509599 mailed Feb. 19, 2024.
U.S. Appl. No. 63/233,567, filed Aug. 16, 2021.
Examination Report for Indian Patent Application No. 2022215264 mailed Jul. 24, 2023.
Hearing Notice for Indian Application No. 201627037817 mailed Nov. 16, 2023.
Office Action for Canadian Application No. 3,151,806 mailed Aug. 9, 2023.
Office Action for Canadian Application No. 3,170,681 mailed Oct. 20, 2023.
Office Action for Chinese Application No. 202080067832.9 mailed Jul. 1, 2023.
Corrected Notice of Allowability for U.S. Appl. No. 16/718,448 mailed Jun. 2, 2022.
Decision of Dismissal of Amendment for Japanese Application No. 2017-51246 mailed Aug. 31, 2020.
Decision of Rejection for Chinese Application No. 201580029313.2 mailed Mar. 11, 2020.
Decision of Rejection for Japanese Application No. 2017-51246 mailed Aug. 20, 2020.
Decision to Refuse for European Application No. 15793232.8 mailed Jan. 22, 2019.
Examination Report for Australian Application No. 201260773 mailed Jun. 6, 2019.
Examination Report for Australian Application No. 2020201126 mailed Feb. 11, 2021.
Examination Report for European Application No. 15793232.8 mailed Sep. 15, 2017.
Examination Report for Indian Application No. 201627037817 mailed Oct. 31, 2020.
Extended European Search Report for European Application No. 15793232.8 mailed May 24, 2017.
International Search Report and Written Opinion from International Application No. PCT/IB2020/058844 mailed Dec. 15, 2020.
International Search Report and Written Opinion from International Application No. PCT/IB2021/050759 mailed Jul. 16, 2021.
International Search Report and Written Opinion from International Application No. PCT/IB2021/052164 mailed Sep. 22, 2021.
International Search Report and Written Opinion from International Application No. PCT/IL2015/050475 mailed Sep. 16, 2015.
Invitation to pay Additional Fees for International Application No. PCT/IB2021/050759 mailed Apr. 30, 2021.
Invitation to Pay Additional Fees for International Application No. PCT/IB2021/052164 mailed Jun. 28, 2021.
Issue Notification for U.S. Appl. No. 15/310,356 mailed May 23, 2018.
Issue Notification for U.S. Appl. No. 16/718,448 mailed Jun. 15, 2022.
Minutes of Oral Proceedings for European Application No. 15793232.8 mailed Nov. 27, 2018.
Non-Final Office Action for U.S. Appl. No. 15/976,669 mailed Sep. 9, 2019.
Non-Final Office Action for U.S. Appl. No. 16/718,448 Mailed Dec. 17, 2021.
Notice of Acceptance for Australian Application No. 2015260773 mailed Nov. 13, 2019.
Notice of Allowance for U.S. Appl. No. 15/310,356 mailed Apr. 16, 2018.
Notice of Allowance for U.S. Appl. No. 15/310,356 mailed Jan. 26, 2018.
Notice of Allowance for U.S. Appl. No. 15/976,669 mailed Jan. 10, 2020.
Notice of Allowance for U.S. Appl. No. 15/976,669 mailed Jun. 4, 2020.
Notice of Allowance for U.S. Appl. No. 16/718,448 mailed Mar. 30, 2022.
Notice of Re-examination of Chinese Application No. 201580029313.2 mailed Jul. 29, 2021.
Office Action for Brazilian Application No. 11 2016 026162 3 mailed Feb. 28, 2022.
Office Action for Chinese Application No. 201580029313.2 mailed May 22, 2019.
Office Action for Chinese Application No. 201580029313.2 mailed Oct. 3, 2019.
Office Action for Chinese Application No. 201580029313.2 mailed Sep. 3, 2018.
Office Action for Japanese Application No. 2017512464 mailed Feb. 27, 2019.
Office Action for Japanese Application No. 2017-512464 mailed Nov. 25, 2019.
Result of Telephone Consultation for European Application No. 15793232.8 mailed Nov. 5, 2018.
Summons to Attend Oral Hearing for European Application No. 15793232.8 mailed Apr. 10, 2018.
Summons to Attend Oral Hearing for European Application No. 15793232.8 mailed May 27, 2021.
U.S. Appl. No. 15/310,356, filed Nov. 10, 2016.
U.S. Appl. No. 15/976,669, filed May 10, 2018.
U.S. Appl. No. 16/718,448, filed Dec. 18, 2019.
U.S. Appl. No. 17/763,351, filed Mar. 24, 2022.
U.S. Appl. No. 61/991,514, filed May 11, 2014.
U.S. Appl. No. 62/906,157, filed Sep. 26, 2019.
U.S. Appl. No. 62/977,313, filed Feb. 16, 2020.
Written Opinion from International Application No. PCT/IB2021/052164 mailed Feb. 9, 2022.
Chou, et al., "Effect of Multiple Antireflection Coatings on Impact Resistance of Hoya Phoenix Spectacle Lenses", Optom Exp Clin, 2006, pp. 86-89.
Meslin, "Opthalmic Optics: Materials and Treatments", Europe Essilor Academy, 2010, 68.

(56)　　　　References Cited

OTHER PUBLICATIONS

Decision on Reexamination Rejection for Chinese Application No. 202080067832.9 mailed Dec. 6, 2024.
Examination Report for Australian Application No. 2020351724 mailed Apr. 4, 2025.
Examination Report for European Application No. 20786059.4 mailed Mar. 11, 2025.
International Search Report and Written Opinion from International Application No. PCT/IB2024/059588 mailed Feb. 24, 2025.
Non-Final Office Action for U.S. Appl. No. 17/763,351 mailed Jan. 27, 2025.
Non-Final Office Action for U.S. Appl. No. 17/904,269 mailed Apr. 3, 2025.
Office Action for Chinese Application No. 202180019255.0 mailed Mar. 18, 2025.
Office Action for Korean Application No. 10-2022-7014044 mailed Feb. 28, 2025.
Restriction Requirement for U.S. Appl. No. 18/051,140 mailed Apr. 29, 2025.
Office Action for Japanese Application No. JP2022-549827 mailed Apr. 18, 2025.
Office Action for Japanese Application No. 2022-168193 mailed Apr. 18, 2025.
Office Action for Chinese Application No. 202211248167.0 mailed Apr. 29, 2025.
Examination Report for Indian Application No. 202247008235 mailed Jun. 30, 2025.
U.S. Appl. No. 63/424,915, filed Nov. 13, 2022.
Illinger, "Effect of Adhesive on the Impact Resistance of Laminated Plastics for Windshield Applications", Army Materials and Mechanics Research Center, Aug. 1973, pp. 1-13.
Notice of Allowance for U.S. Appl. No. 17/763,351 mailed May 13, 2025.
Office Action for Canadian Application No. 3,151,806 mailed Jul. 15, 2025.

* cited by examiner

DETERMINING A PROGRESSIVE LENS OPTICAL DESIGN

CROSS-REFERENCE TO RELATED APPLICATIONS

The present application is a US national phase of International Application No. PCT/IB2021/050759 to Arkin, filed Jan. 31, 2021 (published as WO 21/161125), entitled "Determining a progressive lens optical design," which claims priority from U.S. Provisional Patent Application No. 62/977,313 to Arkin et al., filed Feb. 16, 2020, entitled "Determining a progressive lens optical design," which is incorporated herein by reference.

FIELD OF EMBODIMENTS OF THE INVENTION

Some applications of the present invention generally relate to ophthalmic lenses. In particular, some applications relate to determining a subject's progressive lens optical design.

BACKGROUND

Presbyopia is a condition that gradually affects most of the population over age 40. The condition results in progressively worsening ability to focus clearly on close objects. Presbyopia is usually treated with multifocal eyeglasses, progressive eyeglasses or contact lenses, since laser-assisted in situ keratomileusis (i.e., LASIK) and other types of surgery are unsuitable for treating this condition.

Corrective lenses are used in eyeglasses to correct presbyopia and other disorders of accommodation. Many people who suffer from presbyopia, additionally suffer from myopia (i.e., near-sightedness). A basic solution for such people is the use of multifocal spectacle lenses. Multifocal spectacle lenses contain two or more lens powers, with each power being suitable for objects that are at respective distances. Bifocals contain two lens powers; trifocals contain three. Progressive spectacle lenses are characterized by a gradient of increasing lens power. The gradient starts at the wearer's distance prescription and reaches a maximum addition power, or the full reading addition, in the lower portion of the lens. The addition in the middle of the lens usually enables clear vision in intermediate ranges, such as reading text on a computer screen. The length of the progressive power gradient on the lens surface depends on the design of the lens, with a final addition power typically being between 0.50 and 3.50 Diopters. The addition value prescribed depends on the level of presbyopia of the patient.

Multifocal and progressive lenses are typically relatively expensive. A significant contributing factor to the high cost of multifocal and progressive lenses is the fact that there is a huge number of (several million) possible optical design combinations, when accounting for near-vision correction, far-vision correction, astigmatism, and angle of astigmatism. The large number of possible combination means that most optical designs cannot be held in stock, but rather must be manufactured on a bespoke basis based on the patient's needs. In addition, there are relatively high numbers of patients who do not adapt to the use of progressive lenses. For these reasons, opticians are often reluctant to recommend progressive lenses, particularly for younger patients.

SUMMARY OF EMBODIMENTS

In accordance with some applications of the present invention, a temporary progressive lens is configured for a subject's temporary use (for example, for a period of between 2 hours and four weeks), based upon an initial progressive-lens optical design. Typically, during use of the temporary progressive lens by the subject, data that are indicative of suitability of the optical design of the lens for activities that are performed by the subject are received. For example, the subject may record such data, and/or the data may be recorded automatically (e.g., using sensors that are associated with a frame of the glasses). Typically, the optical design of the progressive lens that is required by the subject is optimized based upon the received data. Further typically, a non-temporary progressive lens is manufactured based upon the optimized optical design.

For some applications, the temporary progressive lens includes a combination of a base lens and an additional lens. For some such applications, the base lens is a single-focus, far-vision corrective lens and the additional lens is coupled to the single-focus, far-vision corrective lens. Since the progressive lens is only for temporary use and is typically based upon an initial assessment of the lens design that is required by the subject, it is desirable to manufacture the progressive lens using a relatively cheap manufacturing technique. Typically, manufacturing a progressive lens using a combination of a base lens and additional lens is cheaper than manufacturing a bespoke progressive lens using traditional manufacturing techniques in which a single lens is formed such as to provide all of the optical functionalities of the progressive lens (e.g., corrections for near vision, for far vision, for astigmatism, etc.).

Furthermore, it is desirable that the temporary progressive lens be supplied to the patient as quickly as possible, in order to expedite the supply of a permanent progressive lens to the subject. Typically, manufacturing a progressive lens using a combination of a base lens and an additional lens allows the temporary lens to be provided to the patient more quickly than if a single lens were to be shaped according to the subject's optical requirements. This is because the temporary progressive lens can typically be manufactured at a retail location using a relatively small stock of base lenses and additional lenses, whereas manufacturing a bespoke progressive lens using traditional manufacturing techniques is typically performed off-site at a laboratory. For some applications, once the optical design of the subject's lens has been optimized using the techniques described herein, a non-temporary progressive lens that matches the optimized optical design is manufactured using traditional manufacturing techniques, in which a single lens is configured to provide all of the optical functionalities of the progressive lens. Alternatively, even the non-temporary lens that matches the optimized lens design is manufactured using a combination of a base lens and an additional lens.

For some applications, one or more sensors are coupled to a frame of glasses within which the temporary progressive lens is placed. For example, the sensors may include one or more location and/or orientation sensors (e.g., accelerometers) and/or proximity sensors that are configured to provide sensor data that are indicative of when the glasses are removed from the subject's face, repositioned, or are placed upon the subject's face. Removal of glasses or repositioning of the glasses on the wearer's nose are indicative of visual discomfort of the wearer. For some applications, in response to detecting that the subject's glasses have been removed or repositioned, a computer processor prompts the subject to provide a reason for the removal and/or repositioning of the glasses. For example, the computer processor may generate context-specific questions or provide the subject with choices regarding the reason for the removal. For some applications, such prompts are output on the subject's smart-phone (or other electronic device).

For some applications, the sensors include a gyroscope (e.g., a solid-state gyroscope). Typically, the gyroscope provides data that are indicative of the subject's head position. For some applications, based upon these data, the computer processor derives how much time a subject spends utilizing near, intermediate and far-vision portions of the progressive lenses in his/her daily activities. For some applications, the sensors include one or more solid-state spirit levels that are configured to generate data that are indicative of the degree of the subject's head tilt (which, in turn, is indicative of the portion of the lens through which the subject is looking). For some applications, the sensors include a miniature camera that is configured to monitor the subject's pupils, and/or a miniature camera that is config-ured to monitor the subject's eyelids, such that the frequency and/or duration of the subject's blinks may be measured. Alternatively or additionally, the sensors include an ambient light sensor. For some applications, the sensors include a sensor (e.g., a rangefinder) that is configured to measure the distance to viewed objects that correspond to the direction of the subject's gaze. For some applications, the sensors include a real-time clock, a motion-detection sensor, an accelerometer, a GPS locator, and/or a combination thereof, that are configured to provide data relating to the subject's movement, location, time-of-day, and speed of the subject (e.g., such as to determine whether the subject is driving, biking, running, walking, and/or stationary), while using the temporary progressive lens.

There is therefore provided, in accordance with some applications of the present invention, a method including:

providing a temporary progressive lens that is configured for a subject's temporary use, based upon an initial progressive-lens optical design;
   receiving data that are indicative of suitability of the optical design for activities that are performed by the subject, the data being generated during use of the temporary progressive lens by the subject;
   based upon the received data, optimizing the optical design for a progressive lens for the subject; and
   outputting the optimized optical design.

In some applications, providing the temporary progres-sive lens includes providing a temporary progressive lens that is made of a base lens and an additional lens, the base lens including a single-focus optically corrective lens, and the additional lens being configured to convert the base lens to a progressive lens.

In some applications, receiving the data includes receiv-ing data that are generated manually by the subject.

In some applications, receiving the data includes receiv-ing data that are indicative of how much time the subject spends performing respective activities.

In some applications, receiving the data includes receiv-ing data that are indicative of how use of the temporary progressive lens correlates with performance of respective activities by the subject.

In some applications, receiving the data includes receiv-ing data that are generated automatically via sensors. In some applications, receiving the data includes receiving data that are generated automatically via sensors that are dis-posed on a frame of glasses within which the temporary progressive lens is placed. In some applications, receiving the data includes receiving data from one or more sensors that are configured to detect when the glasses are removed from the subject's face, repositioned, and placed upon the subject's face. In some applications, receiving the data includes receiving data from one or more gyroscopes that are indicative of a head position of the subject. In some applications, receiving the data includes receiving data from one or more cameras that are configured to monitor a pupil of an eye of the subject. In some applications, receiving the data includes receiving data from one or more cameras that are configured to monitor an eyelid of the subject. In some applications, receiving the data includes receiving data from one or more light sensors that are configured to monitor a level of ambient light. In some applications, receiving the data includes receiving data from one or more sensors that are configured to measure a distance to viewed objects that correspond to a direction of a gaze of the subject. In some applications, receiving the data includes receiving data from one or more solid-state spirit levels that are configured to generate data that are indicative of a degree of head tilt of the subject.

There is further provided, in accordance with some appli-cations of the present invention, apparatus including:

a temporary progressive lens configured for temporary use by a subject, based upon an initial progressive-lens optical design; and
   at least one computer processor configured to:
      receive data that are indicative of suitability of the optical design for activities that are performed by the subject, the data being generated during use of the temporary progressive lens by the subject;
      based upon the received data, determine an optimized optical design for a progressive lens for the subject; and
      output the optimized optical design.

In some applications, the temporary progressive lens includes a base lens and an additional lens, the base lens including a single-focus optically corrective lens, and the additional lens being configured to convert the base lens to a progressive lens.

In some applications, the computer processor is config-ured to receive the data by receiving data that are generated manually by the subject. In some applications, the computer processor is configured to receive the data by receiving data that are indicative of how much time the subject spends performing respective activities.

In some applications, the computer processor is config-ured to receive the data by receiving data that are indicative of how use of the temporary progressive lens correlates with performance of respective activities by the subject.

In some applications, the apparatus further includes one or more sensors, and the computer processor is configured to receive the data by receiving data that are generated auto-matically by the one or more sensors. In some applications, the apparatus further includes a frame of glasses that is configured to hold the temporary progressive lens, the one or more sensors are disposed on the frame. In some applica-tions, the one or more sensors are configured to acquire data that are indicative of when the glasses are removed from the subject's face, repositioned, and placed upon the subject's face. In some applications, the one or more sensors are configured to acquire data that are indicative of a head position of the subject. In some applications, the one or more sensors include one or more cameras that are configured to monitor a pupil of an eye of the subject. In some applica-tions, the one or more sensors include one or more cameras that are configured to monitor an eyelid of the subject. In some applications, the one or more sensors include one or more light sensors that are configured to monitor a level of ambient light. In some applications, the one or more sensors include one or more sensors that are configured to measure a distance to viewed objects that correspond to a direction of a gaze of the subject. In some applications, the one or more sensors include one or more solid-state spirit levels that are configured to generate data that are indicative of a degree of head tilt of the subject.

There is further provided, in accordance with some applications of the present invention, a method for use with a temporary progressive lens that is configured for a subject's temporary use, based upon an initial progressive-lens optical design, the method including:

placing the temporary progressive lens inside a frame that is configured to be worn by the subject;

receiving data from one or more sensors that are associated with the frame and that are configured to acquire data that are indicative of use of the temporary progressive lens by the subject, while the subject performs activities;

based upon the received data, determining an optimized optical design for the progressive lens; and outputting the optimized optical design.

In some applications, placing the temporary progressive lens inside the frame includes placing inside the frame a temporary progressive lens that is made of a base lens and an additional lens, the base lens including a single-focus optically corrective lens, and the additional lens being configured to convert the base lens to a progressive lens.

In some applications, receiving the data from the one or more sensors includes receiving data that are indicative of how much time the subject spends performing respective activities.

In some applications, receiving the data from the one or more sensors includes receiving data that are indicative of how use of the temporary progressive lens correlates with performance of respective activities by the subject.

In some applications, receiving the data from the one or more sensors includes receiving data from one or more sensors that are configured to detect when the frame is removed from the subject's face, repositioned, and placed upon the subject's face. In some applications, receiving the data from the one or more sensors includes receiving data from one or more gyroscopes that are configured to detect data that are indicative of a head position of the subject. In some applications, receiving the data from the one or more sensors includes receiving data from one or more cameras that are configured to monitor a pupil of an eye of the subject. In some applications, receiving the data from the one or more sensors includes receiving data from one or more cameras that are configured to monitor an eyelid of the subject. In some applications, receiving the data from the one or more sensors includes receiving data from one or more light sensors that are configured to monitor a level of ambient light. In some applications, receiving the data from the one or more sensors includes receiving data from one or more sensors that are configured to measure a distance to viewed objects that correspond to a direction of a gaze of the subject. In some applications, receiving the data from the one or more sensors includes receiving data from one or more solid-state spirit levels that are configured to generate data that are indicative of a degree of head tilt of the subject.

There is further provided, in accordance with some applications of the present invention, apparatus for use with a temporary progressive lens configured for temporary use by a subject, based upon an initial progressive-lens optical design, the apparatus including:

a frame in which the temporary progressive lens is configured to be placed, the frame being configured to be worn by the subject and including one or more sensors configured to acquire data that are indicative of use of the temporary progressive lens by the subject, while the subject performs activities; and at least one computer processor configured to:

receive the data from the sensors;

based upon the received data, determine an optimized optical design for a progressive lens for the subject; and output the optimized optical design.

In some applications, the computer processor is configured to receive the data by receiving data that are indicative of how much time the subject spends performing respective activities.

In some applications, the computer processor is configured to receive the data by receiving data that are indicative of how use of the temporary progressive lens correlates with performance of respective activities by the subject.

In some applications, the one or more sensors are configured to acquire data that are indicative of when the frame is removed from the subject's face, repositioned, and placed upon the subject's face. In some applications, the one or more sensors are configured to acquire data that are indicative of a head position of the subject. In some applications, the one or more sensors include one or more cameras that are configured to monitor a pupil of an eye of the subject. In some applications, the one or more sensors include one or more cameras that are configured to monitor an eyelid of the subject. In some applications, the one or more sensors include one or more light sensors that are configured to monitor a level of ambient light. In some applications, the one or more sensors include one or more sensors that are configured to measure a distance to viewed objects that correspond to a direction of a gaze of the subject. In some applications, the one or more sensors include one or more solid-state spirit levels that are configured to generate data that are indicative of a degree of head tilt of the subject.

The present invention will be more fully understood from the following detailed description of embodiments thereof, taken together with the drawings, in which:

DETAILED DESCRIPTION OF EMBODIMENTS

Figure 1:
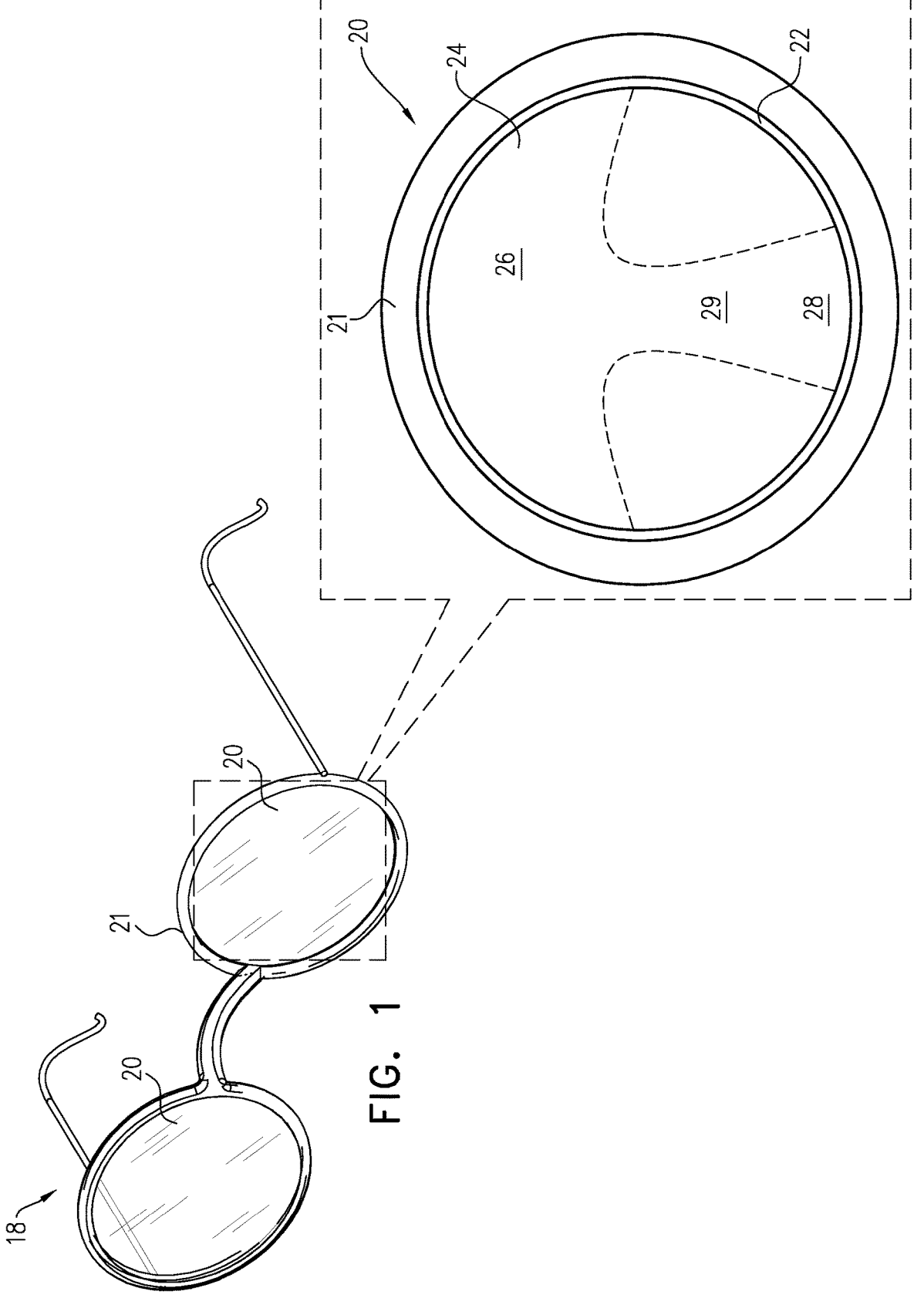
FIG. 1 is a schematic illustration of a pair of glasses that contains one or more temporary progressive lenses, in accordance with some applications of the present invention.

Reference is now made to FIG. 1, which is a schematic illustration of a pair of glasses 18 that includes one or more progressive lenses 20, in accordance with some applications of the present invention. For some applications, progressive lens 20 is a temporary progressive lens that is configured for a subject's temporary use (for example, for a period of between 2 hours and four weeks), based upon an initial progressive-lens optical design. Typically, during use of the temporary progressive lens by the subject, data that are indicative of suitability of the optical design of the lens for activities that are performed by the subject are received. For example, the subject may record such data, and/or the data may be recorded automatically (e.g., using sensors that are associated with a frame 21 of the glasses), as described in further detail hereinbelow. Typically, the optical design of the progressive lens that is required by the subject is optimized based upon the received data. Further typically, a non-temporary progressive lens is manufactured based upon the optimized optical design. For some applications, based upon the received data, a determination is made that progressive lenses are unsuitable for the subject.

Referring to the enlarged portion of FIG. 1, for some applications, temporary progressive lens 20 includes a combination of a base lens 22 and an additional lens 24. For some such applications, base lens 22 is a single-focus, far-vision corrective lens and additional lens 24 is coupled to the single-focus, far-vision corrective lens. Typically, additional lens 24 is coupled to the inner surface of base lens 22 (i.e., the surface of the lens that is closer to the user's eyes when the lens is incorporated into glasses that are worn by the user). Alternatively, additional lens 24 is coupled to the outer surface of base lens 22 (i.e., the surface of the lens that is farther from the user's eyes when the lens is incorporated into glasses that are worn by the user). Typically, temporary progressive lens 20 includes a far-vision corrective region 26, a near-vision corrective region 28, and a transition region 29. For some applications, additional lens 24 is coupled to base lens 22 via an adhesive layer, and/or is coupled to the base lens using alternative techniques, e.g., as described in U.S. Pat. No. 9,995,948 to Arieli, which is incorporated herein by reference. It is noted that, in the enlarged portion of FIG. 1, a gap is shown between the outer edge of the additional lens and glasses frame 21. Typically, such a gap would not exist in practice, and such a gap is only shown in FIG. 1 for illustrative purposes, in order to show additional lens 24 and base lens 22.

Figure 2:
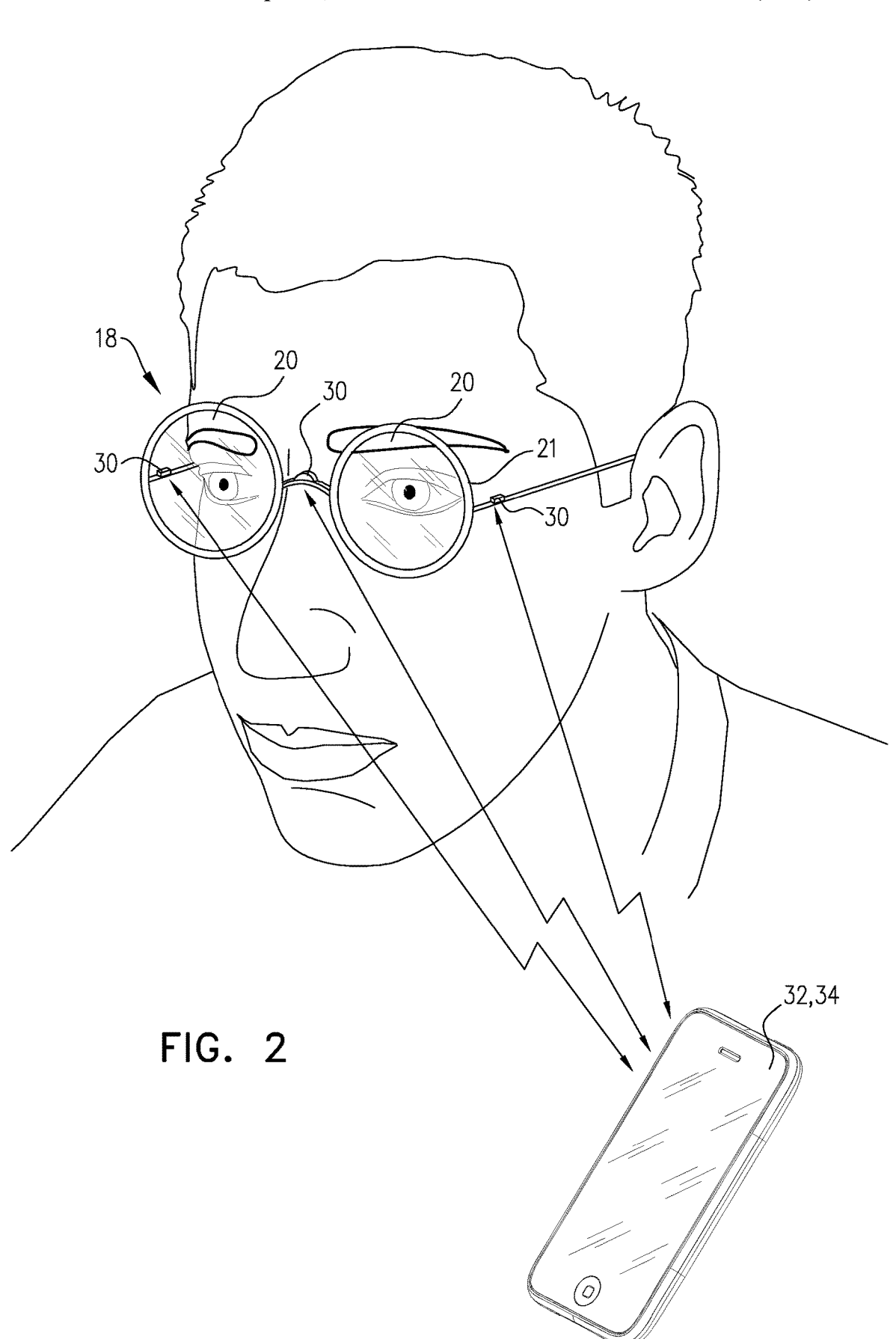
FIG. 2 is a schematic illustration of a pair of glasses that has sensors coupled thereto, in accordance with some applications of the present invention.

Since progressive lens 20 is only for temporary use and is typically based upon an initial assessment of the lens design that is required by the subject, it is desirable to manufacture progressive lens 20 using a relatively cheap manufacturing technique. Typically, manufacturing a progressive lens using a combination of base lens 22 and additional lens 24 of the type shown in FIG. 2 is cheaper than manufacturing a bespoke progressive lens using traditional manufacturing techniques in which a single lens is formed such as to provide all of the optical functionalities of the progressive lens (e.g., corrections for near vision, for far vision, for astigmatism, etc.).

Furthermore, it is desirable that the temporary progressive lens 20 be supplied to the patient as quickly as possible, in order to expedite the supply of a permanent progressive lens to the subject. Typically, manufacturing a progressive lens using a combination of base lens 22 and additional lens 24 of the type shown in FIG. 2 allows the temporary lens to be provided to the patient more quickly than if a single lens were to be shaped according to the subject's optical requirements. This is because the temporary progressive lens can typically be manufactured at a retail location using a relatively small stock of base lenses and additional lenses, whereas manufacturing a bespoke progressive lens using traditional manufacturing techniques is typically performed off-site at a laboratory.

For some applications, once the optical design of the subject's lens has been optimized using the techniques described herein, a non-temporary progressive lens that matches the optimized optical design is manufactured using traditional manufacturing techniques, in which a single lens is configured to provide all of the optical functionalities of the progressive lens. Alternatively, even a non-temporary lens that matches the optimized lens design is manufactured using a combination of a base lens and an additional lens of the type shown in FIG. 2.

It is well known that certain individuals do not adapt well to using progressive lenses, and prefer to use different corrective devices (e.g., glasses or contact lenses) for respective activities (such as reading, outdoors activities, working on a computer, etc.). For some applications, based upon the data that are received during the use of the temporary progressive lens by the subject, it is determined that the use of progressive lenses is not suitable for the subject.

For some applications, temporary lens 20 does not include coatings, such as an anti-scratch coating. Typically, this discourages the subject from using the temporary lens for longer than its intended temporary usage, since the lens will tend to become scratched within this period.

For some applications, the extent to which the subject's eyes need to be tested prior to providing temporary lens 20 is less than would typically be performed prior to ordering a non-temporary progressive lens for the subject. This is because, since lens 20 is only configured for temporary use and since the optical design for the permanent lens is optimized during the use of lens 20, even if lens 20 is not an exact match for the subject's optical requirements, this is typically acceptable.

Reference is now made to FIG. 2, which is a schematic illustration of frame 21 of glasses 18, in accordance with some applications of the present invention. For some applications, one or more sensors 30 are coupled to frame 21. For example, the sensors may include one or more location and/or orientation sensors (e.g., accelerometers) and/or proximity sensors that are configured to provide sensor data that are indicative of when the glasses are removed from the subject's face, repositioned, or are placed upon the subject's face. Typically, the sensors are configured to communicate with a computer processor 32, which may, for example, be a computer processor of the subject's smartphone (or other electronic device) 34 that is running a program or an application that is configured to process the data received from the sensors. Alternatively or additionally, computer processor 32 may be integrated in frame 21, near the sensors 30, or elsewhere. The computer processor has wired and/or wireless interfaces to connect to other external computer processors and associated devices. For some applications, the data that are acquired by the sensors are stored and are then processed by a computer processor (e.g., a computer processor in the optician's office, or a remote, cloud-based computer processor) at a later stage. Removal of glasses or repositioning of the glasses on the wearer's nose are indicative of visual discomfort of the wearer. For some applications, in response to detecting that the subject's glasses have been removed or repositioned, the computer processor prompts the subject to provide a reason for the removal and/or repositioning of the glasses. For example, the computer processor may generate context-specific questions or provide the subject with choices regarding the reason for the removal. For some applications, such prompts are output on the subject's smartphone (or other electronic device).

For some applications, sensors 30 include a gyroscope (e.g., a solid-state gyroscope). Typically, the gyroscope provides data that are indicative of the subject's head position. For some applications, the sensors include one or more solid-state spirit levels that are configured to generate data that are indicative of the degree of the subject's head tilt (which, in turn, is indicative of the portion of the lens through which the subject is looking). For some applications, based upon these data, the computer processor derives how much time a subject spends utilizing near, intermediate and far-vision portions of the progressive lenses in his/her daily activities. For some applications, sensors 30 include a miniature camera that is configured to monitor the subject's pupils, and/or a miniature camera that is configured to monitor the subject's eyelids, such that the frequency and/or duration of the subject's blinks may be measured. Alternatively or additionally, the sensors include an ambient light sensor. For some applications, the sensors include a sensor (e.g., a range-finder) that is configured to measure the distance to viewed objects that correspond to the direction of the subject's gaze. For some applications, the sensors include a real-time clock, a motion-detection sensor, an accelerometer, a GPS locator, and/or a combination thereof, that are configured to provide data relating to the subject's movement, location, time-of-day, and speed of the subject (e.g., such as to determine whether the subject is driving, biking, running, walking, and/or stationary), while using the temporary progressive lens.

For some applications, data are provided that are indicative of a time of an activity, location of the subject, speed of travel of the subject, ambient light, traffic conditions, ambient weather conditions, physical activity of the subject, etc. Typically, based upon the additional data, the computer processor is able to determine general information regarding the subject's lifestyle (e.g., how much time do they spend reading, driving, watching television, outdoors, working in front of a computer screen, etc.) Further typically, based upon the additional data, the computer processor is able to automatically correlate the subject's ophthalmic needs, and/or level of ophthalmic comfort with respective activities. For example, the computer processor may determine that when the subject is working at a computer she/he often removes her/his glasses, or that when the subject is reading she/he often repositions her/his glasses, etc. Such data are typically acquired by the one or more sensors 30 that are coupled to frame 21, and/or by additional sensors that are in communication with the computer processor (e.g., sensors within the subject's smartphone, and/or other electronic device).

Typically, based upon the data that are acquired while the subject is using temporary progressive lens 20, parameters such as optimal corridor length and appropriate near-zone inset placement are optimized for the subject's permanent progressive lens. For some applications, based upon the data that are acquired while the subject is using temporary progressive lens 20, the overall size of the permanent progressive lens may be optimized, which will typically provide guidance to the subject regarding which frames are available for their use.

For some applications, based upon data acquired by sensors 30 (e.g., by an accelerometer, a gyroscope, and/or a camera), the computer processor determines where the subject lies along the spectrum of "eye movers" versus "head movers" with regards to their vision style. Based upon this, the computer processor typically optimizes the configuration of the non-temporary progressive lens. For example, in response to determining that subject is predominantly an "eye mover," the computer processor may determine that the user will benefit from a lens design having relatively wide viewing zones, since the limited width of the viewing zones of many progressive lens designs may restrict lateral eye movement. Alternatively, in response to determining that subject is predominantly a "head mover," the computer processor may determine that the user will benefit from a lens designs having a progression corridor that has a low magnitude of unwanted cylinder, yet is relatively narrow in viewing zones since this is not required by such subjects.

Referring again to FIG. 2, for some applications, frame 21 is a reusable frame that is used for more than one subject. Typically, different temporary progressive lenses are placed within the frame for respective subjects. For some applications, the temporary progressive lens 20 includes a base-and-additional-lens combination, as described hereinabove. For some such applications, the temporary progressive lens 20 for each of the subjects uses the same single-focus, far-vision corrective lens 22, but uses a different additional lens 24, in order to provide their specific optical requirements (e.g., distribution of unwanted cylinder and/or power addition for near-vision). Typically, each of the subjects uses frame 21 with their temporary lenses disposed therein for a temporary period (for example, for a period of between 2 hours and four weeks), before returning the frame to the optician.

For some applications, various parameters of frame 21 are indexed against a retailer's stock of available frames. Such parameters may include pantoscopic tilt, face-form wrap, and vertex distance. Typically, based upon data that are acquired using the techniques described hereinabove, the computer processor eliminates certain frame models which will not accommodate the subject's optical requirements, because of size or curvature constraints. Alternatively or additionally, based upon data that are acquired using the techniques described hereinabove, the computer processor suggests particular frame models which most readily accommodate the optimized optical design for the subject's lens.

It is noted that although some embodiments are described hereinabove as utilizing automatically-acquired data for optimizing the subject's progressive lens optical design, the scope of the present invention includes performing similar techniques but in which at least some data are provided to the computer processor by the subject. For example, as described hereinabove, the computer processor may prompt the subject to indicate a reason for the removal of their glasses. Alternatively or additionally, the subject themselves may provide an input to the computer processor indicating that they have a removed their glasses and their reason(s) for doing so. Further alternatively or additionally, the subject may provide an input indicating an activity that they are currently engaged in, as well as an indication of a current level of ophthalmic discomfort.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 32. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk, an optical disk, and a magnetic storage device. Examples of optical disks include compact disk-read only memory (CD-ROM), compact disk-read/write (CD-R/W) and DVD.

A data processing system suitable for storing and/or executing program code will include at least one processor (e.g., computer processor 32) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 32) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 32 is typically a hardware device programmed with computer program instructions to produce a special purpose computer. For example, when programmed to perform the algorithms described herein, computer processor 32 typically acts as a special purpose ophthalmic-analysis computer processor. Typically, the operations described herein that are performed by computer processor 32 transform the physical state of a memory, which is a real physical article, to have a different magnetic polarity, electrical charge, or the like depending on the technology of the memory that is used.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for use with a temporary progressive lens that is configured for a subject's temporary use, based upon an initial progressive-lens optical design, the method comprising:

placing the temporary progressive lens inside a frame that is configured to be worn by the subject; and by means of at least one computer processor:

receiving data from one or more sensors that are associated with the frame and that are configured to detect when the frame is removed from and/or repositioned on the subject's face, while the subject performs activities;

in response to detecting instances of the frame having been removed from and/or repositioned on the subject's face, receiving an input from the subject indicating their reasons for the frame having been removed from and/or repositioned on the subject's face;

based upon the received data and the reasons provided by the subject for the frame having been removed from and/or repositioned on the subject's face, determining an optimized optical design for the progressive lens; and outputting the optimized optical design.

2. The method according to claim 1, wherein placing the temporary progressive lens inside the frame comprises placing inside the frame a temporary progressive lens that is made of a base lens and an additional lens, the base lens comprising a single-focus optically corrective lens, and the additional lens providing progressive optical power, thereby converting the base lens to a progressive lens.

3. The method according to claim 1, wherein receiving the data from the one or more sensors comprises receiving data that are indicative of how much time the subject spends performing respective activities.

4. The method according to claim 1, wherein receiving the data from the one or more sensors comprises receiving data that are indicative of how use of the temporary progressive lens correlates with performance of respective activities by the subject.

5. The method according to claim 1, wherein receiving the data from the one or more sensors comprises receiving data from one or more gyroscopes that are configured to detect data that are indicative of a head position of the subject.

6. The method according to claim 1, wherein receiving the data from the one or more sensors comprises receiving data from one or more cameras that are configured to monitor a pupil of an eye of the subject.

7. The method according to claim 1, wherein receiving the data from the one or more sensors comprises receiving data from one or more cameras that are configured to monitor an eyelid of the subject.

8. The method according to claim 1, wherein receiving the data from the one or more sensors comprises receiving data from one or more light sensors that are configured to monitor a level of ambient light.

9. The method according to claim 1, wherein receiving the data from the one or more sensors comprises receiving data from one or more sensors that are configured to measure a distance to viewed objects that correspond to a direction of a gaze of the subject.

10. The method according to claim 1, wherein receiving the data from the one or more sensors comprises receiving data from one or more solid-state spirit levels that are configured to generate data that are indicative of a degree of head tilt of the subject.

11. Apparatus for use with a temporary progressive lens configured for temporary use by a subject, based upon an initial progressive-lens optical design, the apparatus comprising:

a frame in which the temporary progressive lens is configured to be placed, the frame being configured to be worn by the subject and comprising one or more sensors configured to acquire data that are indicative of use of the temporary progressive lens by the subject, while the subject performs activities; and at least one computer processor configured to:

receive the data from the sensors;

based upon the received data, detect when the frame is removed from and/or repositioned on the subject's face;

in response to detecting instances of the frame having been removed from and/or repositioned on the subject's face, receiving an input from the subject indicating their reasons for the frame having been removed from and/or repositioned on the subject's face;

based upon the received data, and the reasons provided by the subject for the frame having been removed from and/or repositioned on the subject's face, determine an optimized optical design for a progressive lens for the subject; and output the optimized optical design.

12. The apparatus according to claim 11, wherein the computer processor is configured to receive the data by receiving data that are indicative of how much time the subject spends performing respective activities.

13. The apparatus according to claim 11, wherein the computer processor is configured to receive the data by receiving data that are indicative of how use of the temporary progressive lens correlates with performance of respective activities by the subject.

14. The apparatus according to claim 11, wherein the one or more sensors are configured to acquire data that are indicative of a head position of the subject.

15. The apparatus according to claim 11, wherein the one or more sensors comprise one or more cameras that are configured to monitor a pupil of an eye of the subject.

16. The apparatus according to claim 11, wherein the one or more sensors comprise one or more cameras that are configured to monitor an eyelid of the subject.

17. The apparatus according to claim 11, wherein the one or more sensors comprise one or more light sensors that are configured to monitor a level of ambient light.

18. The apparatus according to claim 11, wherein the one or more sensors comprise one or more sensors that are configured to measure a distance to viewed objects that correspond to a direction of a gaze of the subject.

19. The apparatus according to claim 11, wherein the one or more sensors comprise one or more solid-state spirit levels that are configured to generate data that are indicative of a degree of head tilt of the subject.

\*   \*   \*   \*   \*